United States Patent [19]

Aho

[11] Patent Number: 4,789,921

[45] Date of Patent: Dec. 6, 1988

[54] CONE SHAPED FRESNEL REFLECTOR

[75] Inventor: Kenneth A. Aho, Chisago City, Minn.

[73] Assignee: Minnesota Mining and Manufacturing Company, St. Paul, Minn.

[21] Appl. No.: 16,858

[22] Filed: Feb. 20, 1987

[51] Int. Cl.[4] .......... F21V 7/00; G02B 5/08

[52] U.S. Cl. .......... 362/348; 350/613

[58] Field of Search .......... 362/301, 341, 348, 349; 350/613, 452

[56] References Cited

U.S. PATENT DOCUMENTS

| | | | |
|---|---|---|---|
| 1,976,163 | 10/1934 | Exelmans | 362/348 |
| 3,523,721 | 8/1970 | Hofmann | 350/613 |
| 4,350,412 | 9/1982 | Steenblik | 350/613 |
| 4,418,379 | 11/1983 | DeMarsh | 362/341 |

FOREIGN PATENT DOCUMENTS

| | | | |
|---|---|---|---|
| 62170 | 12/1954 | France | 362/348 |
| 132363 | 4/1929 | Switzerland | 362/348 |
| 462813 | 3/1937 | United Kingdom | 362/341 |
| 1300540 | 12/1972 | United Kingdom | 350/613 |
| 1365893 | 9/1974 | United Kingdom | 362/341 |

*Primary Examiner*—Douglas Hart

*Attorney, Agent, or Firm*—Donald M. Sell; Stephen W. Buckingham

[57] ABSTRACT

A Fresnel-type reflector having the physical shape of a cone. In a preferred embodiment, the reflector is made by forming a reflective coating on a structured surface of a thin flexible film and forming the film into the shape of a cone. The structures on the surface are designed to cause the reflector to imitate the optical properties of a parabolic reflector when the reflector of the invention is formed into the shape of a cone.

32 Claims, 2 Drawing Sheets

CONE SHAPED FRESNEL REFLECTOR

The present invention relates to Fresnel-type reflectors and, in one aspect, to such reflectors having a selected geometric shape which increases light gathering efficiency.

BACKGROUND OF THE INVENTION

In many applications a reflector having a particular cross-section is desired. Such cross-sections may be parabolic, spherical, ellipsoidal, or of other shapes depending upon the requirement of the application. Parabolic reflectors are particularly commonly required. That is because parabolic reflectors will provide a collimated beam of light from a point source.

In designing a light source utilizing a reflector, whether parabolic or of other shape, a focal length and aperture size must be selected. The choice of these two parameters then dictates the depth of the reflecting surface. A problem can arise when an application requires a reflector having a short focal length and a wide aperture. In order to obtain such a desired wide aperture with conventional reflectors, the reflector must be very deep, i.e., enclose a large volume. This can create severe problems when space for the reflector is limited. An example of a situation where such a problem arises is in the design of reflectors for use in automobile taillights.

One solution to this problem is to utilize a Fresnel-type reflector. A Fresnel-type reflector is typically a flat surface having structures in the form of straight or arcuate ridges and grooves which allow such a reflector to mimic the operation of a curved reflector. The problem with using a flat Fresnel-type reflector is that such reflectors are inefficient compared with true curved reflectors. This is because the curved reflector actually surrounds the light source and collects light which is emitted in many directions, while a flat reflector, although mimicking the optical properties of the curved reflector, is only able to colect light which is emitted in the direction of the plane of the reflector.

Another alternative which has been used is to provide a modified curved reflector. In such a reflector a first portion of the reflector will be curved to form a parabola having a short focal length. A second portion of the reflector will be curved to form a parabola of a longer focal length. The second portion includes a Fresnel structure which causes the second portion to mimic a parabolic reflector having the same focal length as the first portion of the reflector. This approach provides a reflector having a larger aperture than would be possible for the given focal length and depth of the reflector if a standard parabolic reflector were used. Reflectors of this type, however, still enclose an undesirably large volume.

SUMMARY OF THE INVENTION

In the present invention a Fresnel-type reflector is produced on a thin sheet of flexible material or film. A wedge shaped portion of the sheet is removed and the remaining portion of the radial Fresnel is bent into a cone. The resulting conical reflector will have the properties of the type of reflector which the Fresnel structure was designed to imitate, but will provide higher efficiency by collecting a larger portion of the light emitted by the light source. A reflector of this sort may be made to encompass much less volume than would be required by a smooth specular reflector having the shape that the Fresnel structure is designed to imitate.

DETAILED DESCRIPTION OF THE PREFERRED EMBODIMENTS

Figure 1:
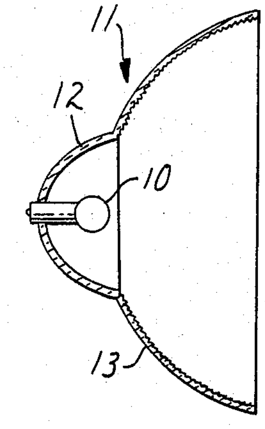
FIG.1 PRIOR ART
FIG. 1 is a vertical sectional view of a prior art reflector.

FIG. 1 illustrates a prior art approach to provide a reflector having a short focal length and a wide aperture. The system of FIG. 1 includes a light source 10 and a reflector 11, which is shown in cross-section. Reflector 11 includes a first portion 12 which is parabolic and has a focal length, typically, of approximately one inch. The reflector further includes a second portion 13 which is also parabolic in shape but has a longer focal length, typically about two inches. Portion 13 of reflector 11, however, includes a Fresnel structure which causes that portion of the reflector to have the same properties as a parabolic reflector having the focal length of portion 12 of reflector 11.

Figure 2:
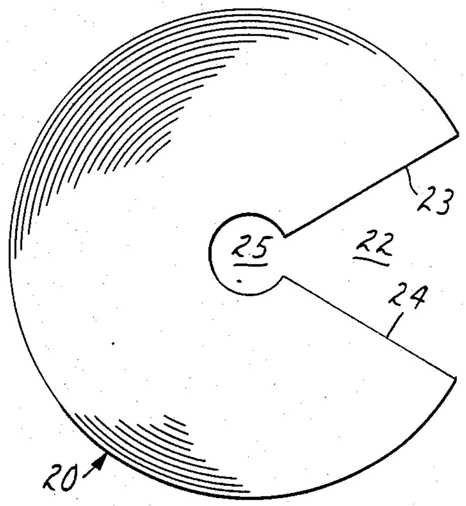
FIG. 2 is a plan view of a reflector corresponding to the present invention.

FIG. 2 shows a Fresnel-type reflector 20 having Fresnel structures, shown schematically as concentric rings 21, on one surface of a thin flexible substrate. In the preferred embodiment, one facet of each prismatic ring is designed to reflect light incident thereon from a predetermined source along a generally parallel path. The surface of reflector 20 having Fresnel structures 21 is silvered in a known manner to provide a reflecting surface. In the preferred embodiment aluminum is vacuum deposited on the surface. A wedge shaped portion of the sheet material 20 is removed leaving opening 22. Opening 22 has radial edges 23 and 24. A central aperture 25 is also left open.

In order to utilize reflector 20 in the present invention edges 23 and 24 are brought together and reflector 20 is formed into a truncated cone. If desired, edges 23 and 24 may be bonded to one another. When such a cone is formed, Fresnel structures 21 become a series of coaxial ridges and grooves.

In the preferred embodiment Fresnel structures 21 are designed to mimic the characteristics of a parabolic reflector having a one inch focal length when the reflector is formed into a cone in which the sides form a 140° angle with one another. For use in automobile taillights, focal lengths of one half inch to one and one half inches are generally used, although nothing in the invention precludes the use of other focal lengths or even Fresnel structures which imitate the actions of reflectors with shapes other than parabolic.

Figure 3:
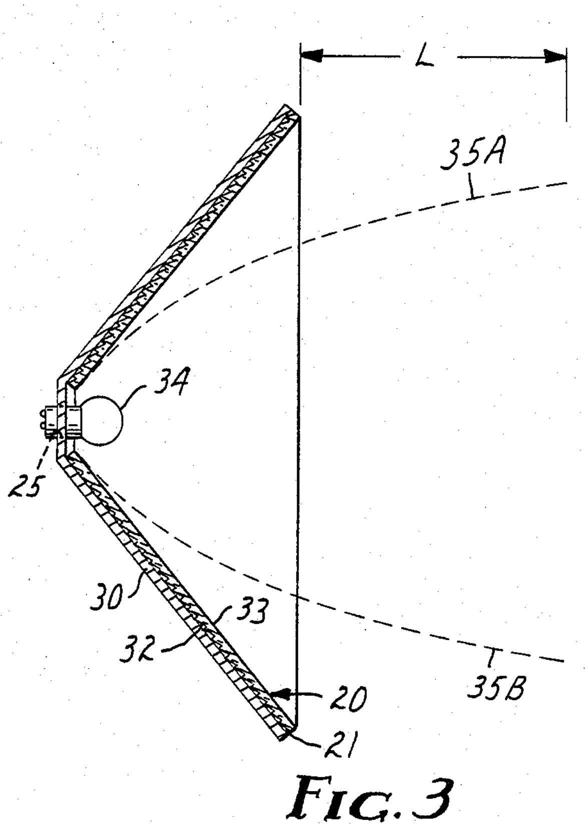
FIG. 3 is a cross-sectional view of a reflector according to the invention.

FIG. 3 shows Fresnel reflector 20 mounted on a rigid support 30 in the shape of a truncated cone. As shown Fresnel structures 21 are adjacent to support cone 30. Fresnel-type reflector 20 is bonded to support cone 30 by means of an adhesive which is inserted in the grooves produced by virtue of the Fresnel structures 21, such as groove 32. Clearly, to utilize the structure shown in FIG. 3, the sheet material forming the reflector 20 must be transparent in order to allow light to reach the Fresnel structures 21. Nothing in the invention precludes positioning smooth surface 33 of Fresnel-type reflector 20 adjacent to support cone 30 and Fresnel structures 21 on the outer surface. The embodiment shown in FIG. 3 is, however, preferred because the positioning of Fresnel structure 21 adjacent to support cone 30 allows smooth surface 33 to protect Fresnel structures 21 from physical damage.

Light source 34, in this case an incandescent light bulb, is inserted through the hole provided by aperture 25 of FIG. 2. As may be seen from FIG. 3, light emitted by light bulb 34 through a wide range of angles will be reflected by Fresnel-type reflector 20, providing a compact high efficiency lamp.

Dashed lines 35A and 35B represent the parabolic reflector which would be equivalent to Fresnel-type reflector 20. The distance designated by length L represents the depth saved by a reflector of the current invention as compared with a conventional parabolic reflector having the same focal length and aperture. In the preferred embodiment the cone is two inches deep. A comparable parabolic reflector which does not utilize Fresnel structures would require a depth of four inches to provide the same aperture. Thus, two inches, or half the depth of the parabolic reflector, are saved.

The discussion above assumes that the design goal of the reflector is to provide a reflector having a large aperture which occupying less volume than an equivalent parabolic reflector. In some circumstances the reflector's volume may be unimportant while a high light gathering efficiency is required. In such a situation a conic Fresnel-type reflector may be designed to have a greater depth than an equivalent smooth parabolic reflector. Such a reflector will have a greater light gathering efficiency than an equivalent reflector which does not utilize Fresnel structures.

Figure 4:
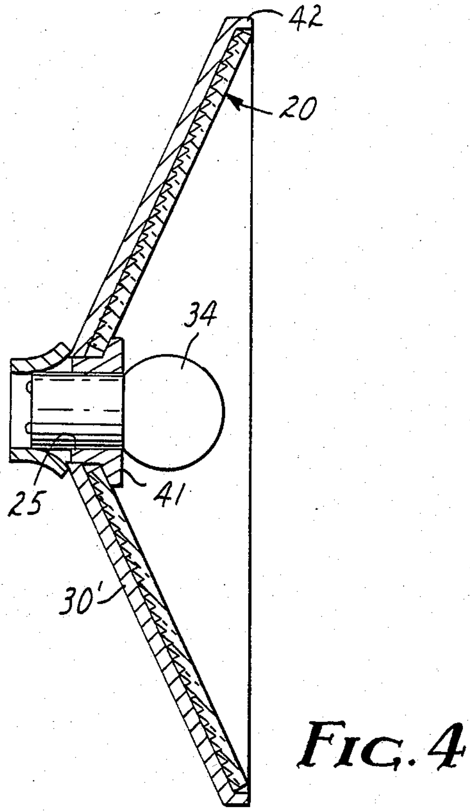
FIG. 4 is a cross-sectional view of a second embodiment of the invention utilizing a modified support cone.

FIG. 4 illustrates an alternative embodiment of the invention. In the embodiment of FIG. 4, light bulb 34 is held in aperture 25 by means of a housing 40. Housing 40 includes a retainer clip 41. Retainer clip 41 extends over Fresnel-type reflector 20. Additionally support cone 30′ includes a retainer 42 which extends beyond the end of Fresnel-type reflector 20. Using this structure Fresnel-type reflector 20 will be held in place without the requirement of the adhesive which was used in the embodiment of FIG. 3 to bond Fresnel-type reflector 20 to support cone 30. Instead the natural tendency of the flexible substrate to pull towards a flat state will hold reflector 20 in place.

Figure 5:
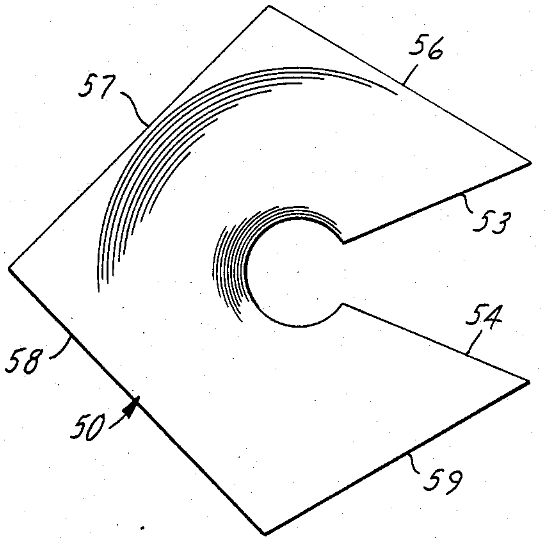
FIG. 5 is a plan view of a further embodiment of the invention.

FIG. 5 shows a Fresnel reflector 50 which could be used with an alternative embodiment of the invention. In the embodiment with which reflector 50 would be used, edges 53 and 54 are radial to the Fresnel-type structures and are provided to be joined as would edges 23 and 24 of FIG. 2. Rather than the round perimeter as provided for reflector 20 of FIG. 2, reflector 50 has a perimeter consisting of sides 56, 57, 58 and 59. When edges 53 and 54 are joined reflector 50 may be placed into a support cone similar to support cone 30 of FIG. 3 or support cone 30′ of FIG. 4 which has a square aperture, rather than a round one, with the corners of the sheet as illustrated in FIG. 5 being disposed in a plane. Sides 56, 57, 58 and 59 will depart from that plane, but the projection of those sides in that plane will be square. Similarly other geometric shapes may be produced by appropriate design of the perimeter of the Fresnel-type reflector.

Having described the invention with reference to several embodiments, it is to be understood that other modifications can be made without departing from the invention as claimed.

I claim:

1. A reflector apparatus comprising a reflector having a major surface, said major surface being reflective and having coaxial Fresnel-type structures thereon, said reflector being formed into the shape of a cone having a base.

2. The apparatus of claim 1, wherein said base is circular.

3. The apparatus of claim 1, wherein said base is rectangular.

4. The apparatus of claim 1, wherein said Fresnel-type structures are disposed in parallel planes and one facet of each structure causes said reflector to have the optical properties of a parabolic reflector.

5. The apparatus of claim 1, wherein said cone is a truncated cone.

6. The apparatus of claim 1, wherein said reflector is made of a flexible material.

7. The apparatus of claim 6, further comprising conical support means for supporting said reflector.

8. The apparatus of claim 7, wherein said reflector is bonded to said conical support means by an adhesive.

9. The apparatus of claim 8, wherein said Fresnel-type structures cause said reflector to have the optical properties of a parabolic reflector.

10. The apparatus of claim 9, wherein said cone is a truncated cone.

11. The apparatus of claim 7, wherein said conical support means comprises retaining means for holding said reflector.

12. The apparatus of claim 11, wherein said Fresnel-type structures cause said reflector to have the optical properties of a parabolic reflector.

13. The apparatus of claim 12, wherein said cone is a truncated cone.

14. The apparatus of claim 1, wherein said reflector is made of an optically transparent material and said major surface is coated with a reflecting material.

15. The apparatus of claim 14, wherein said Fresnel-type structures cause said reflector to have the optical properties of a parabolic reflector.

16. The apparatus of claim 14, wherein said reflector is made of a flexible material.

17. The apparatus of claim 16, further comprising conical support means for supporting said reflector.

18. The apparatus of claim 17, wherein said reflector is bonded to said conical support means by an adhesive.

19. The apparatus of claim 18, wherein said Fresnel-type structures cause said reflector to have the optical properties of a parabolic reflector.

20. The apparatus of claim 19, wherein said cone is a truncated cone.

21. The apparatus of claim 16, wherein said conical support means comprises retaining means for holding said reflector.

22. The apparatus of claim 21, wherein said Fresnel-type structures cause said reflector to have the optical properties of a parabolic reflector.

23. The apparatus of claim 22, wherein said cone is a truncated cone.

24. A thin sheet of a flexible material having a major surface, said major surface being reflective and having concentric, Fresnel-type structures thereon, said sheet having a periphery which includes first and second edges radial to said Fresnel-type structures such that, when said edges are brought together, the sheet is formed into the shape of a cone having a base.

25. The sheet of claim 24 wherein said base is round.

26. The sheet of claim 24 wherein said base is square.

27. The sheet of claim 24 wherein said Fresnel-type structures cause said sheet to have the optical properties of a parabolic reflector when said radial edges are brought together.

28. The sheet of claim 24 wherein said cone is a truncated cone.

29. The sheet of claim 28 wherein said Fresnel-type structures cause said sheet to have the optical properties of a parabolic reflector when said radial edges are brought together.

30. The sheet of claim 24 wherein said sheet is optically transparent and said major surface is coated with a reflecting material.

31. The sheet of claim 30 wherein said cone is a truncated cone.

32. The sheet of claim 31 wherein said Fresnel-type structures cause said sheet to have the optical properties of a parabolic reflector when said radial edges are brought together.

* * * * *